(12) United States Patent
Ollis et al.

(10) Patent No.: US 8,192,125 B2
(45) Date of Patent: Jun. 5, 2012

(54) FASTENER AND FASTENING SYSTEM

(76) Inventors: William Henry Ollis, Haddenham (GB); David James Chadwick, Manchester (GB)

( * ) Notice: Subject to any disclaimer, the term of this patent is extended or adjusted under 35 U.S.C. 154(b) by 456 days.

(21) Appl. No.: 12/306,711

(22) PCT Filed: Jan. 10, 2007

(86) PCT No.: PCT/GB2007/000047
§ 371 (c)(1),
(2), (4) Date: Feb. 20, 2009

(87) PCT Pub. No.: WO2008/001031
PCT Pub. Date: Jan. 3, 2008

(65) Prior Publication Data
US 2009/0279983 A1  Nov. 12, 2009

(30) Foreign Application Priority Data
Jun. 27, 2006  (GB) .................................. 0612745.0

(51) Int. Cl.
*F16B 16/08*  (2006.01)
(52) U.S. Cl. .......................................... 411/454; 52/379
(58) Field of Classification Search .................. 411/454, 411/387.1, 386, 402, 408, 383; 52/703, 705, 52/379; 29/456, 525
See application file for complete search history.

(56) References Cited

U.S. PATENT DOCUMENTS

| | | | |
|---|---|---|---|
| 5,030,052 A * | 7/1991 | Anderson et al. | 411/383 |
| 5,391,029 A | 2/1995 | Fardell | |
| 5,586,605 A | 12/1996 | Paterson et al. | |
| 6,443,238 B1 * | 9/2002 | Paterson et al. | 173/1 |
| 7,269,987 B2 * | 9/2007 | Ollis | 72/64 |
| 2006/0254789 A1 * | 11/2006 | Murakami et al. | 173/210 |

FOREIGN PATENT DOCUMENTS

| | | |
|---|---|---|
| DE | 83203 | 3/1895 |
| DE | 37 16 808 | 12/1988 |
| EP | 0 150 906 | 1/1989 |
| EP | 0 171 250 | 9/1992 |

(Continued)

OTHER PUBLICATIONS

Search Report for Application No. GB 0711897.9, Feb. 20, 2009.

(Continued)

*Primary Examiner* — Gary Estremsky
(74) *Attorney, Agent, or Firm* — Fay Sharpe LLP

(57) ABSTRACT

The present invention utilises impact-driven fastener (1) having a twisted body having: a common axial core (2) a protruding helix (3) and a trailing elongate lost-end driving shank: (4) of reduced radial diameter. The fastener incorporates two or three loosely wound loosely wound thread-cutting blade-like helical projections (5) extending radially from a solid axial core (2). These blade-like projections (5) are inclined upon a sweeping helical angle (8) of less than 42° to the longitudinal axis (9) of the core (2). The elongate shank (4), which carries no swept angle thread-cutting blades, has a reduced cross sectional diameter that is approximately one half or less of a cross-sectional circumscribed diameter (7) of a protruding helix (3), from which it extends coaxially, such as to fit into and cooperate with a driving adapter (21) having a hollow leading end (24), said leading end of a driving adapter having an external diameter that is less than a cross-sectional circumscribed diameter (7) of the fastener (1).

18 Claims, 3 Drawing Sheets

FOREIGN PATENT DOCUMENTS

| | | |
|---|---|---|
| EP | 0 576 034 | 10/1996 |
| EP | 0 741 217 | 9/2002 |
| EP | 1 169 524 | 3/2004 |
| GB | 2 262 560 | 6/1993 |
| GB | 2 359 109 | 8/2001 |
| WO | WO 00/61887 | 10/2000 |

OTHER PUBLICATIONS

International Search Report for International Application No. PCT/GB2007/000047.

Written Opinion of the International Searching Authority for International Application No. PCT/GB2007/000047, Feb. 20, 2009.

* cited by examiner

FASTENER AND FASTENING SYSTEM

FIELD OF INVENTION

The present invention is directed to the subject matter of connecting a plurality of layers of a structure in which a helically profiled fastener is fixed to at least two articles in order to secure the layers substantially in relation to one another.

BACKGROUND OF INVENTION

The technology of connecting two or more construction elements using impact-driven helically profiled fasteners, that is to say helical fixings having loosely wound thread-forming blades, has been commercially practised for the past 20 years. The helical fasteners rely upon the peaks and troughs of a deep set helical profile to interlock within the host material to provide anchorage.

In their simplest form the fasteners are used as headless and flush finish screw-nails that are simply hammered into nail-able layers whereupon they cut a helical interlocking path of penetration. One of the more common applications is in the connection or reconnection of two or more masonry units, whereby long slender versions of the fastener are utilised to tie two layers of a cavity structure.

Hammer drill attachments and telescopic driving mechanisms have been fabricated to increase insertion rates for helical fasteners, which are impactingly driven and recessed into pilot holes that have been pre-drilled into masonry walls.

One specific example of a power driven fastening mechanism is revealed in U.S. Pat. No. 5,586,605, which demonstrates and claims a complex helical tie-driving tool having a combination of parts that have means to circumferentially contain the full diameter of a helical tie and telescopic workings to recess it into a pilot bore such as to deliver a continuous driving and recessing wall tying technique.

Such telescopic mechanisms are, by nature, highly elaborate and such intricacy has detrimental consequence in terms of operational reliability and cost. Indeed insertion tools of this type, or of similar design and function, commonly sell for around one hundred and seventy five US dollars. On the assumption that such a tool has a reliable life or is useful for say 2000 fixing installations, the tooling costs equate to a hefty nine US cents per fastener. However in instances where the user only has a few hundred fasteners to fix, for example where a user has to fix only 200 fasteners, yet still has to spend one hundred and seventy five US dollars for an installation tool, the tooling cost equates to a prohibitive ninety US cents per fixing. Such tooling expenditure is commercially flawed, in terms of cost off-set, and as such is an impediment to the saleability and wide spread exploitation of well established fasteners.

Furthermore such telescopic driving tools rely upon an impacting confrontation with a hosting layer to force a telescoping reaction by which to recess the tie. Such pounding confrontation provides further cost penalty prospect in terms of damage repair to a hosting layer; for example for the repair of damage to a buildings' façade.

A further disadvantage of telescopic driving apparatus is the length of the assembled installation arrangement in use, which in concentric combination comprises the fastener, the extended telescopic insertion tool and the powered machinery that energises the tool. Such lengthy assemblies are operationally cumbersome and may compromise the usability of such a system, particularly in confined spaces. The arrangement of an average 9 inch (230 mm) long wall tie fitted in a telescopic insertion adapter that is in turn fitted to a small rotary hammer drill is over 32 inches (800 mm) long and weighs between 7-9 lb (3-4 kg). The process of offering up and concentrically aligning the entire set up to an average ¼ inch (6.35 mm) pilot hole is itself cumbersome. The further unwieldy process of operating the rotary hammer drill in one hand and using the other outstretched hand to restrain the hefty set up axially and rotationally during the driving operation serves to compound handling difficulties and operator fatigue.

Issues of health and safety can exist with power driven fixings. It will be appreciated that this type of telescopic tool usually operates under a high speed rotary hammer action and is invariably used far above the ground. A complex mechanism in this form can have very severe consequences if it jams or 'snatches' due to malfunction, loss of lubrication or breakage.

Thus there is a need to provide a more manageable, reliable and cost effective means and method of tying components with helically profiled fasteners.

Accordingly, the invention seeks to mitigate at least one of the above-mentioned problems or provide an alternative means for and method of inserting helically profiled fasteners into a structure.

SUMMARY OF THE PRIOR ART

Examples of impact-driven fasteners in the form of helically profiled tubes are disclosed in EP 0150906 (Ollis), which teaches tools and installation methods, including means to drive and recess a helical tube into an undersized pilot bore using a punch with a long spigot.

Examples of commercially viable impact-driven helical wall ties are disclosed in EP 0171250 (Ollis), GB 2262560 (Knight) and GB 2359109 (Kemp), which individually teach different fastener types, including those manufactured from rolled wire, drawn wire and flat strip respectively, each having loosely wound thread-forming projections along substantially the whole of the length of the fastener. Each document teaches specific installation methods and tools, including means by which to recess these solid helical ties into a clearance bore or partial clearance bore, said clearance having a diameter that is large enough to accommodate the full helix diameter and that of a driving sleeve.

An example of a mechanized adapter having means to both drive and recess impact-driven helical wall ties into undersized pre-formed pilot-holes, without the need of a full diameter clearance bore, is revealed in U.S. Pat. No. 5,586,605 (Paterson), which teaches the intricate workings of a multi-faceted telescopic tool. Also taught within this patent is a tie having helically projecting blades along its entire length including along a reduced diameter leading helix portion. The smaller projecting blades on said leading helix portion are for driving into and interlocking with hard materials and the trailing larger diameter helical portion is for gripping into a softer outer leaf mortar joint.

A further example of a two-diameter helical fastener is revealed in EP 1169524 (Knight), which teaches a fastener having major thread forming fins and minor thread-forming fins whereby the major fins can be deformed or removed at the leading end of the fastener leaving the minor interlocking fins, which extend the whole of the length of the fastener, to drive into steel.

Each of the above prior art documents are pertinent in that they chronologically illustrate the current art and the development thereof.

SUMMARY OF THE INVENTION

The invention finds significant advantage in a modified impact driven fastening system that is used to efficiently connect and secure construction layers or elements using a solid helical fastener that can be drivingly recessed without the need for unsightly clearance bores and without the need for costly and intricate adapters of the telescopic type. The essential elements of the inventions are defined by the independent claims and the advantageous embodiments are distinguished in the dependent claims.

In view of the forgoing, according to one aspect of the present invention there is provided an improved impact-drivable helical fastener. Advantageously the fastener is in the form of a solid wall tie, fixing or fastener that is formed and configured with a twisted body having a common axial core and a protruding helix adjacent to a pointed leading end and an elongate lost-end driving shank of reduced diameter at a trailing end. The fastener incorporates two or three loosely wound thread-cutting blade-like projections extending radially from a solid core said projections being inclined upon a sweeping helical angle of less than 42° to the longitudinal axis of said core. The fasteners peg-like shank has means to engage a recessing and/or countersinking drive adapter and provides the keying means by which the fastener's insertion can be neatly disguised and/or can be made non-obtrusive.

The inventors believe that the current invention represents a much improved system over the prior art devices in terms of fastener configuration, tooling simplicity and method of controlled close-quarter working.

According to a further aspect of the invention there is provided a driving adapter. For example, the driving adaptor can be in the form of an unyielding essentially singular element driving and recessing adapter, which has means to cooperate with an elongate driving shaft of an improved helical fastener and means to recess the fastener without need for costly and unwieldy telescopic tool mechanisms or unsightly large diameter clearance holes. The adapter can be made in the form of a single substantially rigid body or alternatively in the form of an assembly of parts in a fixed relationship that together make a substantially rigid body. Advantageously the adaptor has a fixed geometry, that is, it has no axially moving parts between the impact driving machine and the fastener.

According to yet a further aspect of the present invention there is provided a method of simultaneously driving and recessing a helical wall tie fixing or fastener. The method provides a more controlled and safer approach whereby hazards associated with malfunction of multi-part tool mechanisms are alleviated and the unwieldy balance and cumbersome length of the overall insertion arrangement is reduced and is manageable.

According to another aspect of the invention there is provided an impact drivable fastening assembly. A beneficial result of the invention is a novel and cooperative fastener and tooling arrangement having means to safely and reliably drive and recess a helical tie to offer an improved systematic fastening method.

An additional benefit of the present invention is the efficiency of the fastener and adapter combination, which delivers extremely rapid insertion rates. For example when driven with a machine that delivers about 2 ft. lbs. of impact energy (2.7 joules) rapid thread-cutting rates of penetration of between ½ an inch and 1½ inches (12.7 mm and 38.1 mm) per second are readily achievable in masonry layers. This permits an average 9 inch (230 mm) long tie to be fully driven and recessed in between 6 and 18 seconds, a fixing rate of between 3 and 10 per minute.

Yet a further benefit of the present invention is provided by the trailing reduced diameter peg-like driving shank, which permits a secure keying encasement with bore-disguising fillers.

None of the prior art documents mentioned above discloses a solid helical tie having means to be simultaneously mechanically driven and countersunk into a host layer, either directly or via a fine pilot hole, by an adapter having no telescopic mechanisms or internal workings. Similarly none of the above patents teach a recessed or countersunk solid helically twisted fastener having means to engage filling material or add-on components when driven either directly or via a fine pilot hole into a host layer.

According to another aspect of the present invention, there is provided a drive adapter for transmitting at least axial force from an impact-energy driving machine to a driving shank of a helical profiled fastener, said drive adaptor including a substantially rigid body having a tail end that is arranged to be engaged and driven by the impact-energy driving machine and a leading end that includes a formation that is arranged for drivingly engaging the driving shank. Advantageously the formation may comprise a substantially axial recess that is arranged to receive the drive shank, wherein the recess includes a fixed end wall that is arranged to impart impacting drive from the driving machine to the drive shank. Advantageously the outer periphery of the leading end may include an abrasive part or cutting formation that is arranged to abrade or cut a host material when inserting the fastener into the host material. Advantageously the recess is dimensioned to allow relative rotational movement between the drive shank and the adaptor. For example, if the impact-energy driving machine is arranged to rotate the adaptor as well as impart an axial driving force, then the fastener is able to rotate at a different speed to the adaptor. This enables tools such as hammer drills to be used to provide the axial driving force to the fastener. Advantageously the outer periphery of the leading end may have a smaller maximum cross sectional dimension than the maximum cross sectional dimension of the fastener.

BRIEF DESCRIPTION OF THE DRAWINGS

Further aspects and advantages of the present invention will become apparent as the following description of an illustrative embodiment proceeds, taken in conjunction with the accompanying drawings, in which.

DESCRIPTION OF PREFERRED EMBODIMENT

The Fastener

Figure 1:
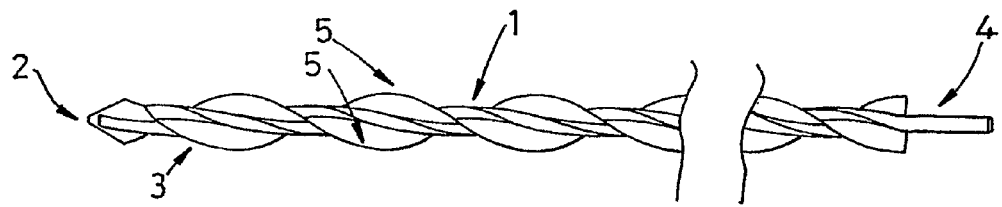
FIG. 1 illustrates a fastener of the present invention, the fastener having a twisted body having a substantially solid common axial core, a protruding helix extending from a pointed leading end and a trailing elongate lost-end driving shank of reduced radial diameter.

A typical impact-driven fastener 1 of the present invention has a twisted wire body incorporating a protruding swept angle helix 3 positioned between a substantially conical or frusto-conical 11 leading point end and an elongate trailing lost-end driving shank 4 of reduced radial diameter and is shown in exemplified form at FIG. 1.

The twisted body has a solid common axial core 2 that continues substantially the whole of the length of the fastener, said common axial core 2 having a maximum cross sectional diameter that is at least sixty percent less than a cross sectional circumscribed diameter of the fasteners helix 7. It will be appreciated that in having a twisted body and a relatively small axial core the fastener benefits from having torsional elastic properties that permit it to accommodate minor movements between affixed layers without affecting the security of connection.

A helix 3, which tapers from the leading end of a fastener 1, is formed by two or three loosely wound thread-cutting blade-like helical projections 5 that are preferably work hardened and which extend radially from a solid common core 2 of the fastener. Beneficially for impact-driven fixings the slender thread-cutting projections are inclined upon a sweeping helical angle of less than 42° to the longitudinal axis of the core. The swept angle blade-like projections 5 may vary in length and are continuous around the core 2 for one full 360° rotation of pitch at least up to a length whereby they form a substantive proportion of the fasteners length, although not a full length portion. Preferably said swept angle blade-like projections 5 extend along at least 75% of the full length of the fastener 1. Preferably said swept angle blade-like projections 5 extend along less than 97% of the full length of the fastener 1.

Figure 2:
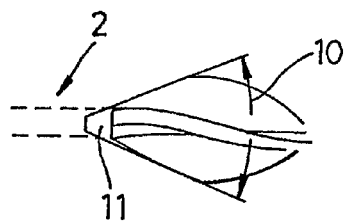
FIGS. 2 and 2A illustrate the angular formations of the fastener.

At the trailing end of the fastener is an integral elongate lost-end driving shank 4, which carries no swept angle thread-cutting blades. The elongate shank 4 has a reduced cross sectional diameter that is approximately one half or less of a cross-sectional circumscribed diameter 7 of a protruding helix 3, from which it extends coaxially such as to permit a sliding engagement into a hollow portion of a drive adapter having sufficient wall thickness to neatly recess the fastener as later described. FIG. 2 shows the leading end of the fastener having an axial core 2 that is tapered at its leading edge. This leading point end is sharp enough to aid efficient driving and prevent wander whilst being not so sharp as to cause splitting of the material into which it is being hammered. The axial core 2 is locally reduced in diameter by at least 10% and not more than 90% to form a small substantially conical or frusto-conical 11 leading portion from which a plurality of helical projections gradually extend. Preferably the inclusive taper angle 10 at the leading portion of the fastener is greater than 40° and less than 120°.

Figure 2A:
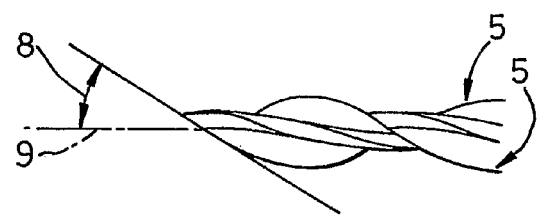

FIG. 2A shows a portion of the fastener of FIG. 1 and identifies a swept angle of the blade-like projections 5. It will be appreciated that in order to be conducive to being driven with a primarily axial driving force the helical fastener features "sweeping" loosely wound blade-like projections 5, as opposed to conventional tightly coiled machine-screw threads, which would need to be driven with a primarily rotational driving force. That is to say the sweeping projections are essentially inclined upon an angle that is nearer to the longitudinal axis of the fastener than an angle that is perpendicular to it. For example a beneficial and cooperative sweeping angle that is between 0° and 45° to the longitudinal axis of the fastener rather than a detrimental and uncooperative angle that is between 45° and 90° to said axis. In practice neither a solely axial force nor a solely rotational force is likely to drive a thread-cutting fastener having a thread angle of between 42° and 48°.

In this example the fastener has a full 360° rotation of pitch over an axial distance that is equal to five times the circumscribed diameter of the fasteners helix. Given such a 5:1 ratio of twist to diameter the resultant sweeping helical angle 8 of the blade-like projections 5, at their outer periphery, can be calculated as being a little over 32° to the longitudinal axis 9 of the fastener. The fasteners helical twist rate to diameter may vary from a 3.5:1 ratio up to a 8.5:1 ratio such that the helical angle 8 at the periphery of blade-like projections 5 is greater than 20° and less than 42° to the longitudinal axis of the fastener 9. For use in the majority of fastening conditions and to provide the best resistance to axial service loading the most preferred swept helix angle 8 is greater than 30° and less than 39° to the fasteners longitudinal axis 9.

Figure 3:
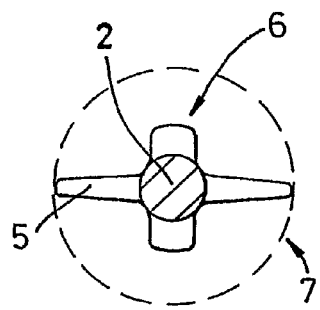
FIGS. 3 and 3A each illustrate a cross section of typical protruding helix portions and the circumscribed diameters thereof that are formed around the outer periphery of slender and elongate blade-like projections that extend radially from a solid axial core.

FIG. 3 shows, in an enlarged form, a cross section of a protruding helix portion and a circumscribed diameter 7 thereof, in which slender and elongate blade-like projections 5 are tapered in cross section from a radiused cross sectional root. Preferably the gauge of the blade at its tip is at least $1/100^{th}$ of an inch (0.25 mm) and less than $1/10^{th}$ of an inch (2.5 mm). The example shows stubby reinforcing ribs 6 that extend radially from the core 2 and which are spaced equidistantly between the blades 5. The projecting ribs 6 may, at their outer periphery, have an edge thickness that is at between 1.5 times and 8.5 times an edge thickness of a blade tip and said ribs 6, which have the same pitch distance as the blades 5 but a smaller diameter, may have a sweeping helix angle of between 8° and 23° to the fastener's longitudinal axis provided that a swept helical angle of rib like projections 6 is at least 6° more shallow than a swept helical angle 8 of the thread forming blade-like projections 5.

The length of the fastener may range from as little as 2 inches (50 mm) for use in connecting slender abutting articles up to around 40 inches (1000 mm) for use in connecting much thicker, or relatively widely spaced apart, components.

The circumscribed diameter of the protruding helix portion 7 may be as small as approximately ¼ inch (6.35 mm), such as might be useful in instances where great flexibility of a fastener would be an asset to a particular application. Alternatively the circumscribed diameter of the protruding helix portion 7 may measure up to about ¾ inch (19 mm) for uses that require greater shear resisting capacity and rigidity.

The rigidity or flexibility of the twisted fastener is a function of its size and shape, for example the fasteners circumscribed diameter 7, the diameter of its common axial core material 2, and the provision or absence of stiffening elements such as reinforcing ribs 6 each have an effect on rigidity and torsional elasticity. Further flexural modifications are obtainable by making adjustments to the number of helical blades 5 and/or by fine-tuning the configuration of the projections in terms of dimension and pitch angle.

Figure 3A:
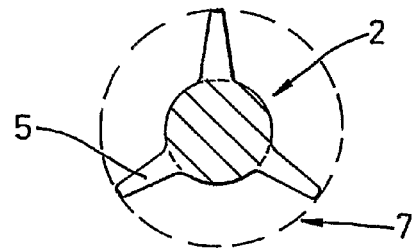

FIG. 3A shows in an enlarged form a cross section of a protruding helix portion that is stiffened by triangulation, and a circumscribed diameter 7 thereof, in which three equidistantly spaced blade-like projections 5 extend radially from an axial core 2.

It will be appreciated that a helix 3 having thread-cutting blades 5 that are positioned at a relative angle of at least 120° to each other, for example those with two or three thread cutting blades 5, provides the fastener with enhanced axial grip by virtue of accommodating, within its active interlocking troughs, a larger and thus stronger portion of the host material than a helical fastener with blades that are spaced at closer angles, for example a helical fastener with four, six or eight thread-cutting blades 5.

Fasteners having more than one protruding helix portion 3 may incorporate a different diameter and helical angle 8 upon each helix portion and this may prove useful in helically connecting layers of varying thickness, density or hardness. However as the blade-like projections are thread-cutting it is vital that the angle of helical profile is substantially uniform upon a given helix diameter.

The Driving Adapter

It will be appreciated that the motivation for the new driving adapter is the need to more safely drive and recess a solid helical fastener into and beneath a surface of a layer of a structure without reliance on complex telescoping tooling and without the need to provide an unsightly large diameter clearance bore.

Figure 4:
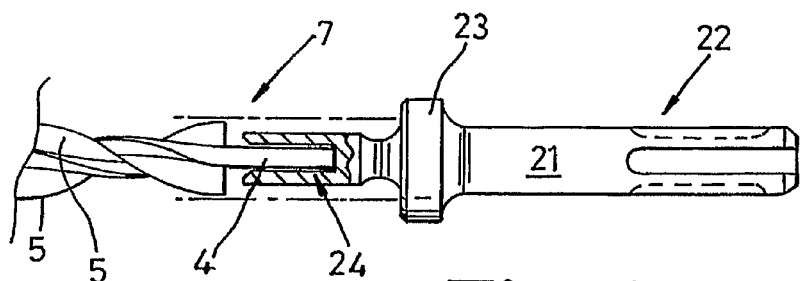
FIG. 4 illustrates a drive tool having means to engage an impacting machine at one end and means to engage the integral driving shank of a fastener at its other end.

FIG. 4 shows a driving adapter 21, which is made of metal or possibly a sintered compound or indeed a combination of both. It has a substantially solid shaft-like tail end 22 and a leading nose end 24 having a hollow axial slideway and is effectively of an unyielding one-piece design, that is to say the fundamental driving portions of the adapter 21 have no telescoping mechanisms or other internal workings that functionally move independently of each other.

The hollow nose portion 24 is dimensioned to receive and cooperate with a reduced diameter shank 4 of a helical profiled fastener. The nose has an external diameter that is preferably smaller than a cross-sectional circumscribed diameter 7 of a helical fastener 1, as is represented by the parallel broken lines in the example shown. Advantageously an outer periphery of the adapter's hollow nose end 24 carries a serrated or knurled portion or similar abrasive formation (FIG. 8, 29) upon its leading section at least.

The substantially solid shaft-like tail end 22 of the adapter 21 has means to engage an impact-energy-delivering driving machine. For example this end of the driving adapter may be fluted such as to permit connection into an SDS type chuck of a rotary hammer drilling machine. Alternatively it may be formed to engage any suitable energising source.

The driving adapter 21 may have a shoulder portion 23 located between each end of the adapter. Ideally the shoulder 23 may carry a compliant washer or buffer.

The Fastening Method

The fastening method, which connects a plurality of layers of a structure and secures them substantially in relation to one another, utilises a helically profiled fastener 1 that is dimensioned to fit into and cooperate with a driving and recessing adapter 21 that has no telescopic driving mechanisms or internal workings.

Figure 5:
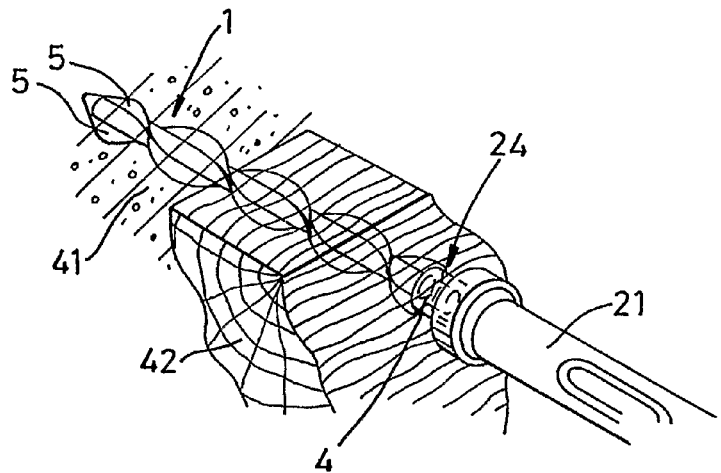
FIG. 5 shows a fastener of the present invention being driven and countersunk to connect a timber layer to a masonry layer.

In the example of FIG. 5 the fastener 1 is impact-driven directly into softer materials such as aerated concrete 41 and softwood 42 by the adapter 21.

The fasteners integral lost-end driving shank 4 slides neatly into a hollow slideway in the leading nose end 24 of a driving adapter 21, the tail end 22 of the adapter being fitted to an impact energy-delivering driving machine. The elongate driving shank 4 is of sufficient dimension to engage the driving adapter's nose portion 24 in a manner that confines the fastener 1 axially and aligns it longitudinally. The length of the hollow slideway in the leading end 24 of the adapter preferably ranges from approximately ⅛ of an inch (3 mm) to about 2½ inches (65 mm) and is less than the length of the fastener's trailing shank 4.

The fastening arrangement is aligned to a material layer or work piece at the desired entry point and entry angle. The fastener 1 is energized/energised by an impact-driving machine/rotary impact driving machine, via axial engagement between the sectional end of the fastener's integral driving shank 4 and a base of a hollow bore within an adapter 21, whereby the fastener 1 is impelled by a series of imparted impacting forces into a host construction material or layer.

The sweeping helical angle of the profile, provides sufficient interface gradient to windingly deflect and rotate the impacted fastener 1, independently of the adapters' spin rate, if any, as its blade-like helical projections 5 set up a self generated spiral penetrative path to windingly cut corresponding helical seating grooves into a host material layer and sequentially on into a subsequent layer or series of layers. The fasteners small and substantially conical or frusto-conical leading portion helps to guide the fastener along its winding penetrative passage to prevent wandering. Fasteners that have no pointed end or that have a two dimensional chiselled chevron type formation with no substantially conical or frusto-conical portion tend to hinder the natural roll of the penetrating fastener and allow it to wander off of the desired path.

It will be appreciated that in use the fastener can only rotate at the rate that it cuts a helical path in the host material, for example its helical pitch angle 8 may rotate the fastener one complete revolution for say each 2 inches (50 mm) of penetration. It may take 2 seconds or so to drive the fastener the 2 inches (50 mm) or 1 full rotation, a spin rate of just 30 revolutions per minute. This will be a different spin rate than that of the driving adapter, which is either energised by a hammer machine having no rotational speed or by a rotary hammer machine having a spin rate many times that of the helically penetrating fastener. The driving shank is dimensioned to fit into and cooperate with a driving adapter having a hollow leading end, wherein the inner diameter of the adapter's nose preferably has an internal diameter that is between 20% and 60% of a cross-sectional circumscribed diameter 7 of the fastener 1 such that provides a slight clearance on the driving shank in order that no rotational force or rotational brake is provided by the inner nose wall of the adapter 21 to the ties shank 4. Beneficially the absence of any swept angle blade like projections upon the driving shank 4 permits a snag-free interface during driving. When driven with rotary hammer impacts, induced torsional thrusts are frictionally delivered to the base of the shank at each impact stroke to improve driving efficiency with fasteners having a pitch angle of at least 30° to the ties longitudinal axis.

Driving continues until the leading nose 24 of the adapter, which has sufficient wall thickness and abrasive periphery to form a countersink into these softer construction layers, follows a fastener's helix 3 beneath a near surface of a host material whereby the fastener 1 including its trailing lost end driving shank 4 is simultaneously recessed or countersunk to an appropriate depth. Advantageously the adapter's hollow nose portion 24 has a wall thickness that is between 10% and 25% of a circumscribed cross sectional diameter 7 of the fastener 1 such as to provide a balance between its preferred small outer diameter and its robustness in use.

A predetermined recessing or countersinking depth can be controlled by the provision of the shoulder portion 23 on a driving adaptor and its relationship to a blind end base within a hollow nose end 24. Ideally a depth-setting shoulder 23 will incorporate a compliant washer or buffer to avoid any impact damage to a host layer. It will be appreciated that as a shoulder 23 meets a surface of a host material the fastener's lost-end 4 is then set to a correct recessed depth and the adapter 21 can be immediately removed, as there is no need to drive an adapter against a hosting material in order to urge a telescopic recessing reaction.

The fastener 1 of the present invention can be used to tie together a variety of similar or dissimilar construction material layers or work-pieces. For example and without limitation, articles of brick, block, concrete and timber will each yield to the impacting blades 5 such as to permit a loosely wound thread-cutting penetration by the fastener and its helical interlock anchorage.

In hard construction materials a pilot bore is pre-formed into the host materials to facilitate and ease driving penetration. Typically the diameter of a pilot bore is greater than that of a fastener's common axial core 2 and lost-end driving shank yet smaller than a circumscribed diameter 7 of an active helix 3. For example, the diameter of a hosting pilot bore will be between 10% smaller and 55% smaller than the fastener's largest diameter.

Figure 6:
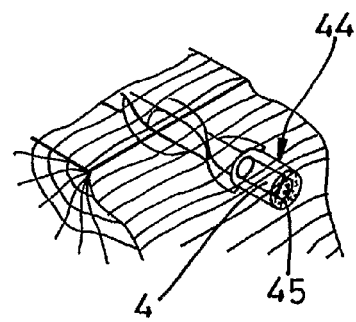
FIG. 6 illustrates the neat and secure finishing plug that encases a peg-like countersunk lost-end driving shank.

FIG. 6 illustrates a localised recess or countersink bore 44, which accommodates a fastener's reduced diameter lost end driving shank 4. The recess 44 can be neatly disguised by the insertion of a plug of filling material 45 that encases, and is compacted around, a peg-like lost-end shank 4, which has a sufficiently reduced radial diameter to permit the use of coarse aggregate particles where appropriate. The filling material preferably matches the existing finish of the structure, for example it may be a colour-formulated paste, mortar or grout that matches a face of the host material in terms of colour, texture and porosity. The recessed or countersunk lost-end driving shank 4 provides a good key for the retention of bore-disguising filler material 45, said keyed surface may be enhanced by the provision of shallow grooves upon a surface of the integral peg-like shank 4. Alternatively the recessed lost-end shank portion 4 may be adapted to provide means to engage add-on components or connections, for example to engage with a push-on crown or a female connecting piece for engaging elongate members in axial alignment with the fastener or substantially perpendicular thereto.

Figure 6A:
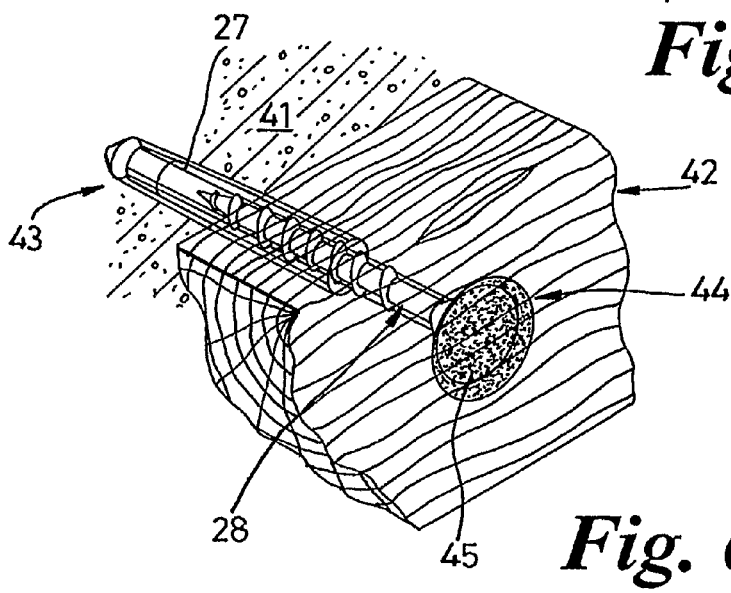
FIG. 6A shows a conventional timber to masonry countersunk fastening and finishing arrangement.

FIG. 6A is representative of a common alternative fixing arrangement, whereby even in the softer materials, such as softwoods 42 and aerated concretes 41, more laborious operations include pre-drilling a clearance bore 43, pre-forming a countersink 44, inserting a wall plug 27, inserting and rotationally driving a screw 28 and making good a large diameter countersink 44 with a shallow dish of filler material 45, all of which fails to provide fixing reliability, deep secure keying or an inconspicuous finish.

Figure 7A:
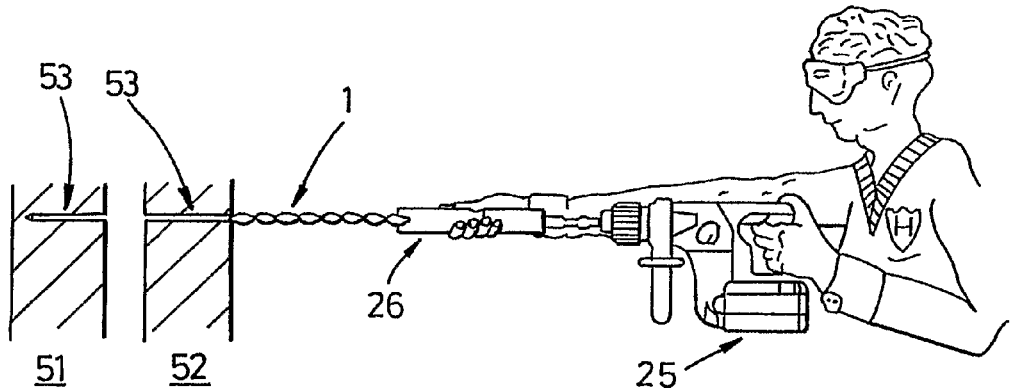
FIGS. 7A and 7B compare a helical wall tie fastening and recessing system known in the art (7A) to the current invention (7B).
Figure 7B:
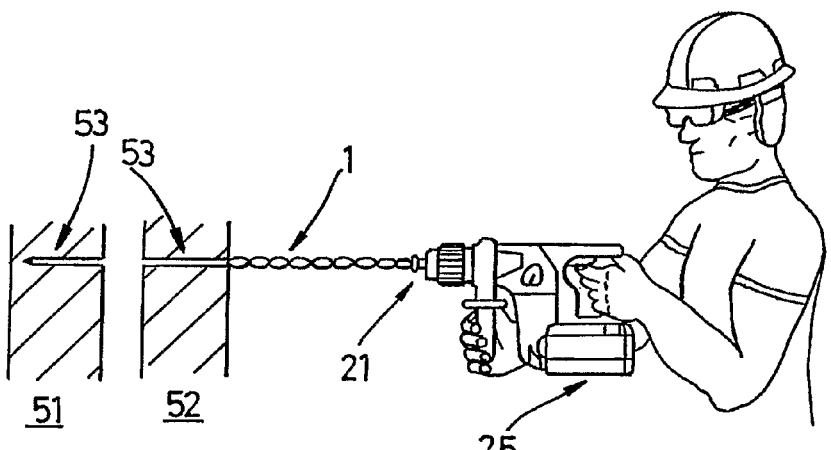

FIGS. 7A and 7B are provided to illustrate functional improvements offered by the fastener 1 and the fastening system of the present invention over conventional helical fastening arrangements, notwithstanding the cost and reliability issues associated with complex insertion tooling that cannot be illustratively represented.

The examples show a typical application for a helical wire fastener, which has been produced through slotted shaping rollers and a twisting arrangement, whereby it is used to connect two wall layers of a cavity wall construction that are of sufficient hardness to require a fine pre-formed pilot bore 53. The fastener is impact-driven by an insertion tool that, in this example, is energised by the rotary hammer action of a drilling machine 25 and the fastener is driven into a pilot hole 53 whereupon it windingly penetrates through the first wall 52 and into the second wall 51 such that helical projections cut into and grippingly interlock with both connected layers.

FIG. 7A illustrates the use of a conventional helical fastener, for example one that has no reduced diameter driving shank portion. The full diameter profile at one end of a helix is inserted into a tubular end of a large diameter telescopic driving tool 26. The fastener is driven until the telescopic tool 26 collides with the first wall layer 52 whereupon hammering continues until a pin telescopically protrudes from the tool to drive the fastener from the tube and recess it beneath the face of the first wall layer 52. As can be seen, the operator has to take the weight of the rotary hammer drill 25 in one hand and has to use the other hand on his outstretched arm to support the weighty telescopic tool 26 and to restrain it from against spinning uncontrollably during driving. He also has to guide this cumbersomely long and unbalanced arrangement such that the lead end of a fastener is driven concentrically into a fine pilot bore 53 that may be only a quarter of an inch (6.4 mm) in diameter, or less. It will be appreciated that with only one hand on a drill 25 the operator is at risk of wrist or shoulder damage if the drill should 'snatch' due to tooling malfunction.

FIG. 7B illustrates an example of the modified fastener, adapter and fastening system in use for the same exemplified application. The elongate reduced diameter driving shank at the trailing end of the fastener 1 is inserted into the adapter 21 of FIG. 4, which confines the axis of said driving shank 4 and aligns the fastener 1 to a pilot hole 53 and permits a controlled and balanced driving operation within much closer working quarters. The fastener's pointed leading end centres it within the pilot bore 53 as the winding helical fastener 1 is impact driven until the slender leading nose end 24 of a driving adapter 21 is itself driven beneath a surface of a masonry layer 52 such as to recess the fastener 1 without complex telescopic means and without prolonged confrontation between an adapter 21 and a wall surface 52. The operator is thus able to work the power drill 25 safely with both hands. Once the fastener is set in position and the adaptor removed from the driving shank the pilot bore and countersink are disguised by the insertion of colour dyed mortar, which is compacted around and retained by the keying surfaces of the reduced diameter lost-end driving shank.

Figure 8:
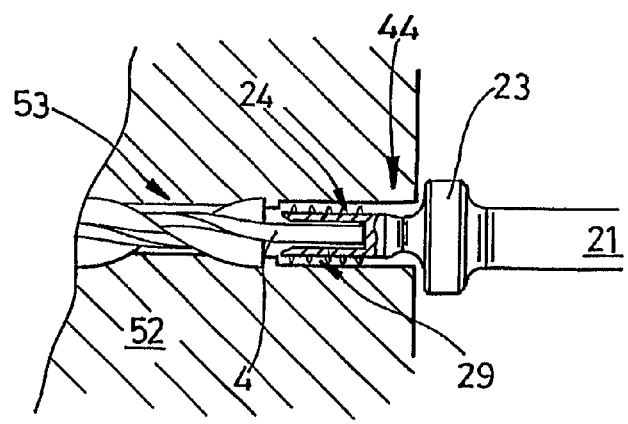
FIG. 8 shows a fastener of the present invention being driven and countersunk in a hard masonry layer.

FIG. 8 shows the nose 24 of an insertion adapter 21 having means to ream out and locally widen a pilot bore 53 in a near-most construction layer 52 to simultaneously provide a countersink recess 44 for the fastener 1 as its lost end driving shank 4 is driven below the surface of the hosting layer. This reaming and countersink forming effect is preferably achieved by the incorporation of a serrated, knurled or similar abrasive formations 29 upon an outer periphery of a leading portion at least of the adapters' nose end 24. It will be appreciated that the adapters' nose end 24 may fit neatly into a clearance afforded by larger pilot bores permitting recessing of the fastener 1 without a localised countersink formation.

Although particular embodiments and examples of the invention have been shown and described in full here, there is no intension to thereby to limit the invention to the details of such embodiments and examples. On the contrary, the invention is to cover all embodiments and usages that clearly fall within the claims of the present invention.

The invention claimed is:
1. A method of connecting a plurality of layers of a structure using a helically profiled fastener comprising a twisted wire body including a common axial core and a protruding helix using a drive adapter having a substantially rigid and non-yielding body, said method including:
engaging a tail end of the adapter with an impact-energy driving machine;

sliding the fastener into a recess in a leading end of the drive adapter;

aligning the fastener to a host material layer;

energizing the fastener with the impact-driving machine via the adapter, whereupon the fastener is impelled by a series of impacting forces to windingly cut helical grooves into the host material layer and onwards into a subsequent layer, wherein the fastener includes a driving shank portion that is elongate and comprises a reduced diameter;

wherein the recessed leading end of the adapter comprises:
(i) a maximum external diameter that is smaller than the cross-sectional circumscribed diameter of the fastener; and, (ii) a wall thickness that is between 10% and 25% of the cross-sectional circumscribed diameter of the fastener, and wherein the leading end of the drive adapter follows the helix into the host material layer during said energizing step, said method further comprising, after said energizing step, removing the adapter from the fastener's driving shank portion leaving the driving shank portion recessed or countersunk in the host material.

2. The method according to claim 1, further including a preparatory step of pre-drilling a pilot bore into a host material.

3. The method according to claim 2, in which the pilot bore has a greater diameter than that of the maximum common axial core and has a smaller diameter than the circumscribed diameter of the protruding helix.

4. The method according to claim 2, in which the pilot bore has a greater diameter than the driving shank and has a smaller diameter than the circumscribed diameter of the protruding helix.

5. The method according to claim 2, wherein the adapter includes an abrasive formation on its leading end to ream out or locally widen the pilot bore into which the leading end is simultaneously driven.

6. The method according to claim 5, wherein the abrasive formation is located on a rigid wall of the leading end and simultaneously forms a countersink in the construction material as the fastener is driven therein.

7. The method according to claim 1, wherein the thread-cutting rates of penetration are of ½ an inch (12.7 mm) or more per second.

8. The method according to claim 1, further including the step of disguising a fastener entry bore by inserting therein filling material to encase and key to the recessed or countersunk driving shank portion.

9. The method according to claim 1, wherein the driving shank portion includes means to engage add-on components.

10. The method according to claim 1, including providing a shoulder portion on the driving adaptor to set a maximum predetermined recessing or countersinking depth via its relationship to a blind end base within the recessed leading end.

11. The method according to claim 10, further including providing a compliant washer or buffer on the shoulder portion of the adapter.

12. The method according to claim 1, wherein the recess is arranged axially and the length of the recess is less than the length of the driving shank.

13. The method according to claim 1, wherein the recess confines the axis of the driving shank.

14. The method according to claim 1, wherein the recess within the leading end of the drive adapter is arranged axially and has an internal diameter that is between 20% and 60% of a cross-sectional circumscribed diameter of the fastener.

15. The method according to claim 1, wherein the protruding helix of the helical fastener extends from a pointed leading end; wherein the protruding helix includes two or three loosely wound thread-cutting blade-like projections extending radially from the core, said projections being inclined on a sweeping helical angle of less than 42° to the longitudinal axis of said core; wherein the driving shank portion extends along less than 25% of the full length of the fastener.

16. The method according to claim 1, wherein:
the protruding helix extends from a pointed leading end;
the driving shank portion is approximately one half or less of the cross-sectional circumscribed diameter of the protruding helix, said driving shank portion carrying no swept angle thread-cutting blades, wherein the driving shank portion incorporates shallow grooves on its surface; and
wherein the protruding helix includes two or three loosely wound thread-cutting blade-like projections extending radially from the core, said projections are continuous around the core for at least one full 360° rotation of pitch, extend along at least 75%, and less than 97%, of the full length of the fastener, and are inclined on a sweeping helical angle of more than 20°, and less than 42°, to the longitudinal axis of said core.

17. The method according to claim 1, wherein the outer periphery of the leading end has an external diameter that is smaller than the external diameter of the tail end of the adapter, and the outer periphery of the leading end includes an abrasive part or cutting formation that is arranged to abrade or cut a host material to ream out a pilot bore, wherein the adapter's recessed leading end includes means to engage the driving shank of the helically profiled fastener and is arranged to permit the engaged helical fastener to rotate independently of the adapter.

18. A method of connecting a plurality of layers of a structure using a helically profiled fastener having a twisted body having a common axial core, a protruding helix and an integral elongate driving shank portion of reduced radial diameter, said method including:

sliding the driving shank portion into a hollow slideway in a leading end of an unyielding driving adapter, which is fitted to an impact-energy driving machine, wherein the adapter includes an abrasive formation on its leading end to ream out the pilot bore into which the leading end is driven in order to countersink the fastener, and wherein the leading end includes means to engage the reduced diameter driving shank of the helically profiled fastener such that it permits the engaged helical fastener to rotate independently of the adapter;

aligning the fastener arrangement to a hosting material layer;

energizing the fastener with the impact-driving machine via the adapter;

whereupon the fastener is impelled by a series of impacting forces to windingly cut helical grooves into the host material layer and onwards into a subsequent layer until the adapter's leading end penetrates the near surface of the host material layer whereby the fastener and its driving shank portion are recessed or countersunk.

* * * * *